US010990359B2

(12) United States Patent
P K et al.

(10) Patent No.: US 10,990,359 B2
(45) Date of Patent: Apr. 27, 2021

(54) USE AND ADVANCEMENTS OF ASSISTIVE TECHNOLOGY IN AUTOMATION FOR THE VISUALLY-IMPAIRED WORKFORCE

(71) Applicant: SAP SE, Walldorf (DE)

(72) Inventors: Sumaiya P K, Bangalore (IN); Prateek Bajaj, New Delhi (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/422,503

(22) Filed: May 24, 2019

(65) Prior Publication Data
US 2020/0371754 A1 Nov. 26, 2020

(51) Int. Cl.
*G06F 8/34* (2018.01)
*G09B 21/00* (2006.01)
*G06F 8/75* (2018.01)
*G06F 40/20* (2020.01)
*G10L 15/26* (2006.01)

(52) U.S. Cl.
CPC .................. *G06F 8/34* (2013.01); *G06F 8/75* (2013.01); *G06F 40/20* (2020.01); *G09B 21/006* (2013.01); *G10L 15/26* (2013.01)

(58) Field of Classification Search
CPC ............. G06F 11/3438; G06F 11/3684; G06F 11/3672; G06F 11/3696; G06F 8/41; G06F 9/451
See application file for complete search history.

(56) References Cited

U.S. PATENT DOCUMENTS

| 6,889,337 | B1* | 5/2005 | Yee | G06F 11/3688 |
| | | | | 434/116 |
| 9,075,462 | B2* | 7/2015 | Sauer | G06F 3/0488 |
| 2005/0278728 | A1* | 12/2005 | Klementiev | G06F 11/3414 |
| | | | | 719/328 |
| 2006/0005132 | A1* | 1/2006 | Herdeg, III | G06F 9/45512 |
| | | | | 715/704 |
| 2007/0291905 | A1* | 12/2007 | Halliday | H04M 1/24 |
| | | | | 379/1.01 |
| 2011/0310041 | A1* | 12/2011 | Williams | G06F 11/3696 |
| | | | | 345/173 |
| 2012/0005542 | A1* | 1/2012 | Petersen | G06F 21/552 |
| | | | | 714/48 |
| 2012/0232907 | A1* | 9/2012 | Ivey | G06F 21/30 |
| | | | | 704/273 |

(Continued)

*Primary Examiner* — Duy Khuong T Nguyen
(74) *Attorney, Agent, or Firm* — Schwegman Lundberg & Woessner, P.A.

(57) ABSTRACT

A method of simplifying automated testing within an integrated development environment (IDE) for a user having a visual impairment is disclosed. An access mechanism is provided for selecting automated testing scripts from within the IDE by responding to audio communications describing one or more access commands. An execution mechanism is provided to the user for executing one or more of the selected automated testing scripts. A result mechanism is provided to the user, the result mechanism including a summary of a result of the executing of the one or more selected testing scripts, the summary based on an analysis of console output of the IDE, the analysis including performing feature extraction and natural language processing on the console output to generate a natural language description of the result. An action mechanism is provided to perform an additional action that is selected based on the type of the result.

20 Claims, 6 Drawing Sheets

(56) References Cited

U.S. PATENT DOCUMENTS

2014/0075336 A1\* 3/2014 Curtis .................... G06N 20/00
715/753
2014/0089824 A1\* 3/2014 George ................ G06F 9/4451
715/762

\* cited by examiner

USE AND ADVANCEMENTS OF ASSISTIVE TECHNOLOGY IN AUTOMATION FOR THE VISUALLY-IMPAIRED WORKFORCE

TECHNICAL FIELD

The present disclosure generally relates to computer accessibility and, in one specific example, to methods and systems for making software test automation tools more accessible to workers with visual impairments.

BACKGROUND

With the advancements in the world of technology reaching greater heights, the developments in accessibility features for the visually impaired workforce have grown manifold. General accessibility resources and tools, such as navigational assistance modules, text-to-speech applications, virtual audio displays, etc., have been in the works. The scope for research is wide, ranging from research on the perspective of users of frequency-lowering hearing aids and electric acoustic stimulation cochlear implants, to letter-based head-movement-driven communication through Augmentative and Alternative Communication (AAC), to eye-reading technologies, such as the Tobii Dynavox Eyemax System, which allows people with disabilities to participate in communication through their eyes, to screen-reading assistants such as Job Access with Speech ("JAWS®").

With the world of technology moving forward by the minute, there is also a lot of enhancement in how technology is being used in the field of automation. In fact, various studies predict that a majority of today's process-oriented jobs may be automated within the next decade. As the field of automation grows, impaired workers are at risk of being left further behind. Not only is there a growing need for better accessibility tools, but there is also a growing need for workers who are capable of doing work in the automation field.

Currently, there is no coalescence around how those in the visually-impaired workforce can be uplifted with the use of assistive technology and accessibility tools to improve their ability to provide automation services.

DETAILED DESCRIPTION

Figure 1:
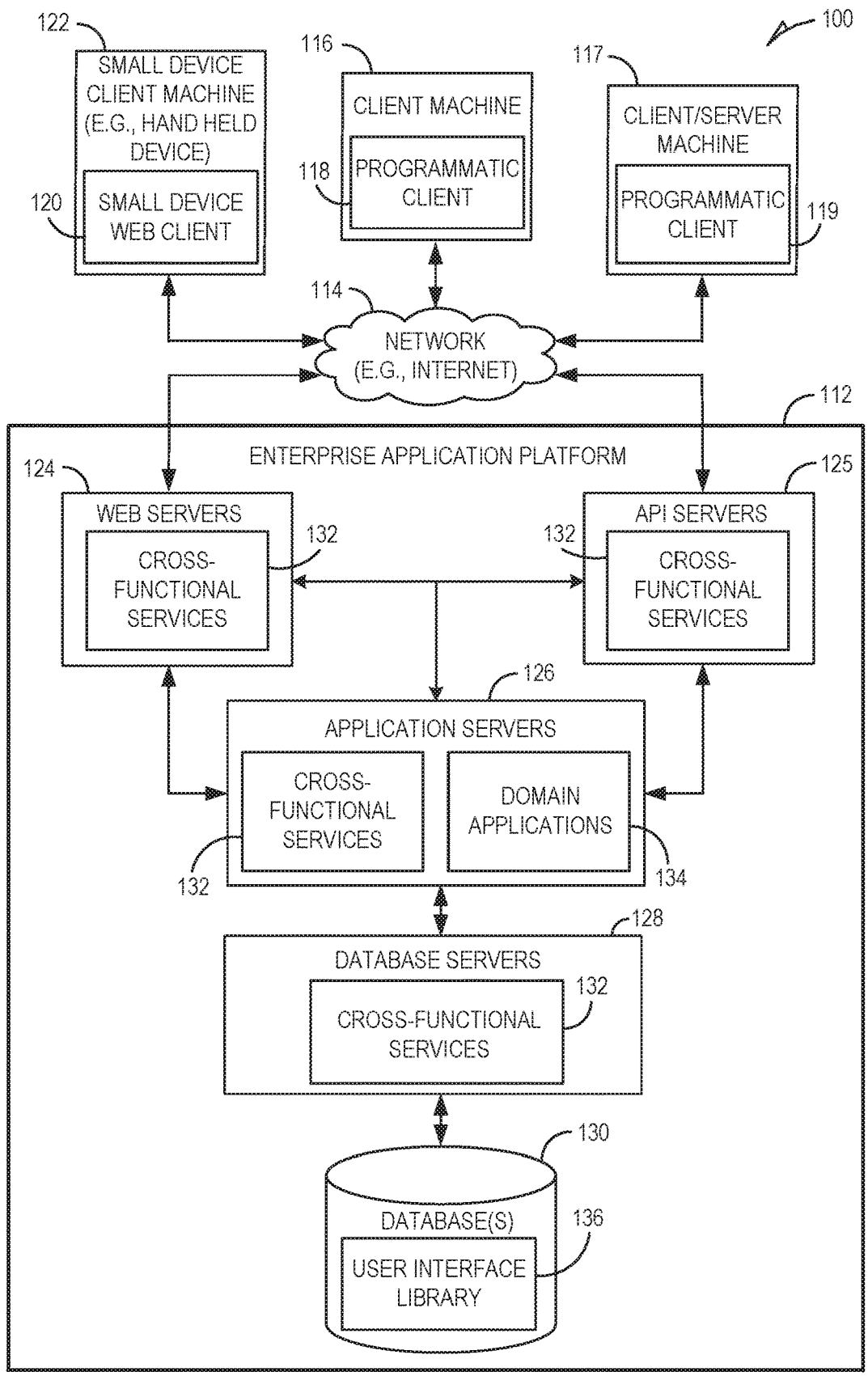
FIG. 1 is a network diagram illustrating a client-server system, in accordance with some example embodiments.

In the following description, for purposes of explanation, numerous specific details are set forth in order to provide an understanding of example embodiments of the present subject matter. It will be evident, however, to those skilled in the art that example embodiments may be practiced without these specific details.

Despite research in the field of assistive technology and accessibility, there is a lot of room for developing better accessibility applications. For example, existing applications often lack a quality user experience for people with disabilities, such as visual impairment, especially when such people attempt to use the applications for performing specialized tasks, such as tasks related to the field of automation. Furthermore, a perceived lack of growth prospects in the innovation for the challenged workforce means that there often does not appear to be a big enough incentive for these existing applications to be improved. For example, when existing assistive technology is paired with a software tool used in the field of automation, workers with disabilities may not be able to navigate efficiently within the application (e.g., based on tab-orders or landmarks not being efficiently used or defined within the application) or move between logically related areas of content (e.g., based on unique titles for pages, headings for sections, or content items not being identified as belonging to a bulleted or numbered list). Other problems associated with impaired users accessing functionality of an IDE for the purpose of performing automated testing, as well as the solutions to the problems (e.g., as provided by a plug-in to a screen-reader application), are discussed in more detail below.

One of the fastest growing industries in the world, the IT (Information Technology) sector, with a yearly spending of more than USD 150 billion, has seen one of the fastest growth streaks in the industries. With the enormity of the software development and testing sector today, a wide range of opportunities come to be alive for the workforce. There are many possibilities in terms of using better technologies, working on better products, and having a shorter learning curve.

This is where the need for a holistic growth in the workforce comes into play. Empathy towards the visually challenged workforce whilst developing newer technologies to work on is vital, or there'll be the dreaded gap between the knowledge and capabilities of the workforce with disabilities and otherwise. The knowledge gap between the varied strata of the same workforce could be cause for a massive disparity, if the right steps aren't provided.

With advancements in the field of technology taking place by the second, the potential for improvements and the shift to better ways of solving business problems is massive. There is innovation happening in the field every minute. While taking the case of software development and testing, and manual versus automation testing as a more specific case, the technology and the way it is solved has seen a tangential shift.

With decades working on manually testing products and software systems, the following major issues have been noted with respect to Manual Testing:

(a) Time consuming and tedious (e.g., humans experience testing fatigue).

(b) Requires huge investment in human resources (e.g., parallel execution requires an increase in human resource expenses).

(c) Lacks reliability and is non-programmable (e.g., humans are prone to mistakes and errors).

In comparison, the newer, more enhanced form of testing, i.e., automation testing, allows for the following advantages:

(a) Cost effective (e.g., except possibly for low-volume regression due to initial investment).

(b) Repeatable and reusable (e.g., tests can be recorded and reused later, such as for load testing, stress testing, spike testing, or other performance testing, can be executed in parallel and/or on different operating platforms to reduce execution time, and can be used in batch testing).

(c) Programmable and comprehensive.

(d) Reliable and provides better coverage of code (e.g., there is no testing fatigue).

The advantages of Automation Testing are manifold in comparison to the almost-archaic Manual Testing today. However, the question remains of how we can grow into and use newer, cutting-edge technologies holistically for every stratum of the workforce. Assistive Technology, however it has become developed for Manual Testing for the visually challenged workforce, still lags behind (or arguably does not even have a solution for) Automation Testing.

With tools such as JAWS (that allow screen reading tools to be integrated with existing software), the visually impaired workforce of today has been actively involved in working on Manual Testing. But there is still little to no advancement in any of assistive technologies to allow for people with visual disabilities to continue applying their skills with respect to automation testing.

Assistive technology lags far behind when it comes to the development and testing of software by and for visually impaired developers working in the field of technology today. For example, if an application or website has not been properly designed to facilitate navigation through tab-through orders or landmarks) or to show logical relationships between different areas of content (e.g., through unique titles, headings, or lists), some of the functionality or content may be difficult for a person having cognitive difficulties, vision impairment, or hearing impairment to access.

In view of such limitations to software, the tool described herein helps employees with visual disabilities to work more efficiently on Automation Testing.

A method of simplifying automated testing within an IDE for a user having a disability (e.g., a visual impairment) is disclosed. An access mechanism is provided to the user for selecting automated testing scripts from within the IDE by responding to audio communications describing one or more access commands. An execution mechanism is provided to the user for executing one or more of the selected automated testing scripts. A result mechanism is provided to the user, the result mechanism including a summary of result of the executing of the one or more selected testing scripts, the summary based on an analysis of console output of the IDE, the analysis including performing feature extraction and natural language processing on the console output to generate a natural language description of the result. An action mechanism is provided to perform an additional action. The additional action is selected based on the type of the result.

This method and various example embodiments disclosed herein may be implemented by a specially-configured computer system. The computer system may be specially configured by one or more modules (e.g., hardware modules or software modules implementing the methods or operations described herein) and implemented by one or more computer processors of the computer system. This method and example embodiments disclosed herein may be embodied as instructions stored on a machine-readable medium that, when executed by one or more processors of a computer system, cause the computer system to perform one or more of the methods or operations described herein. These operations are asserted to be non-routine or unconventional operations, either individually or in combination.

The details of one or more variations of the subject matter described herein are set forth in the accompanying drawings and the description below. Other features and advantages of the subject matter described herein will be apparent from the description and drawings, and from the claims.

FIG. 1 is a network diagram illustrating a client-server system 100, in accordance with some example embodiments. A platform (e.g., machines and software), in the example form of an enterprise application platform 112, provides server-side functionality, via, a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can improve (e.g., increase) accessibility of data across different environments of a computer system architecture. For example, the enterprise application platform 112 can effectively and efficiently enable a user to use real data created from use by one or more end users of a deployed instance of a software solution in a production environment when testing an instance of the software solution in the development environment. The enterprise application platform 112 is described in greater detail below in conjunction with FIGS. 2-7.

Figure 2:
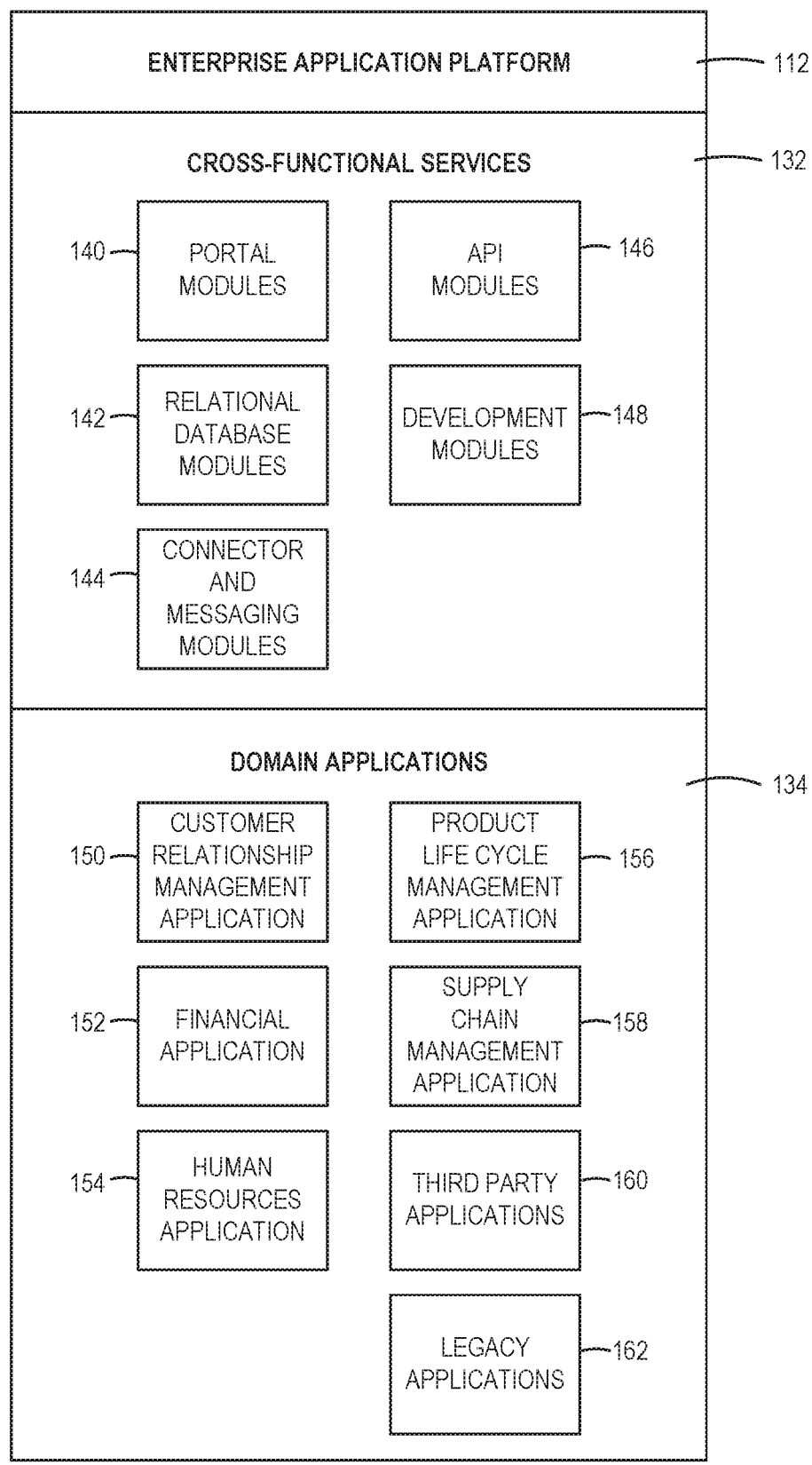
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users and within a defined scope. For example, the role can determine the content that is available to the user and the activities that the user can perform. The portal modules 140 include a generation module, a communication module, a receiving module, and a regenerating module. In addition, the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 can provide support services for access to the database(s) 130, which includes a user interface library 136. The relational database modules 142 can provide support for object relational mapping, database independence, and distributed computing. The relational database modules 142 can be utilized to add, delete, update, and manage database elements. In addition, the relational database modules 142 can comply with database standards and/or utilize a variety of database technologies including SQL, SQLDBC, Oracle, MySQL, Uni code, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real-time information.

The product life cycle management applications 156 can enable the management of a product throughout the life cycle of the product. For example, the product life cycle management applications 156 can enable collaborative engineering, custom product development, project management, asset management, and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
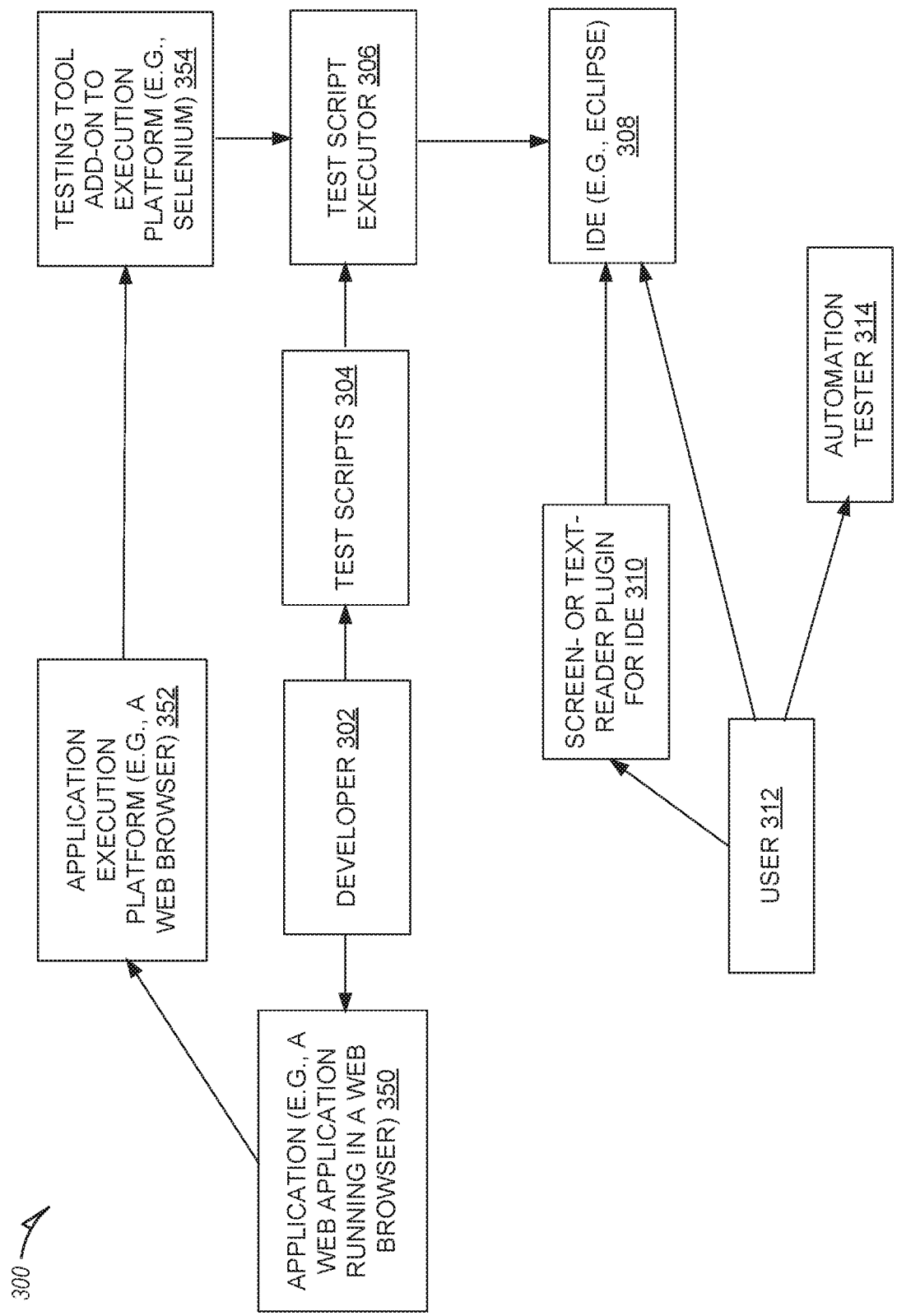
FIG. 3 is block diagram of an example architecture for an accessibility tool for automation testing.

FIG. 3 is block diagram of an example architecture 300 for an accessibility tool for automation testing. In example embodiments, an accessibility framework is provided for visually-impaired workers or employees to be able to efficiently use automation testing tools. In example embodiments, the framework includes a plug-in addition to an existing IDE (independent Development Environment), screen-or-text reader application, or associated automation testing tool.

In example embodiments, one or more developers 302 are software engineers, at least a subset of whom may be visually-challenged employees working on Automation Testing. For example, developers 302 may be software developers creating web applications 350 that run on one or more web browsers 352 and are associated with one or more browser add-ons 354 for running automation scripts (e.g., Selenium scripts).

A testing team from within developers 302 may generate test scripts 304 (e.g., Selenium scripts) for each of a set of plausible task scenarios for the web application 350.

The developed test scripts 304 may then be executed 306 as per the need of the scenarios.

The test scripts 304 running on the web application 350 can be accessed through an IDE 308 configured for the scripts.

A text reader plug-in 310 that is developed as an addition to the existing IDE acts as the accessibility tool for visually-impaired users and developers to be able to access the test scripts with the help of simple keyboard-button clicks. This is where the benefit for a visually-challenged user/developer comes into the picture.

With the screen-reader plug-in, a visually impaired user 312 can access and run the test scripts generated for particular applications, and note down the outputs generated on the console screens with minimal effort and maximum efficiency, without the involvement of any help. Moreover, since running test scripts requires minimal coding knowledge, it makes it completely plausible for visually-disabled developers/testers to work on them using the screen-reader plug-in. In example embodiments, the user is responsible for manually testing those applications, generating error reports, and detailing issues and bugs faced while testing the applications.

With the help of the text-reader plug-in 310, the visually-impaired user can parse through the output of the console and perform further actions accordingly as an automation tester 314.

Figure 4:
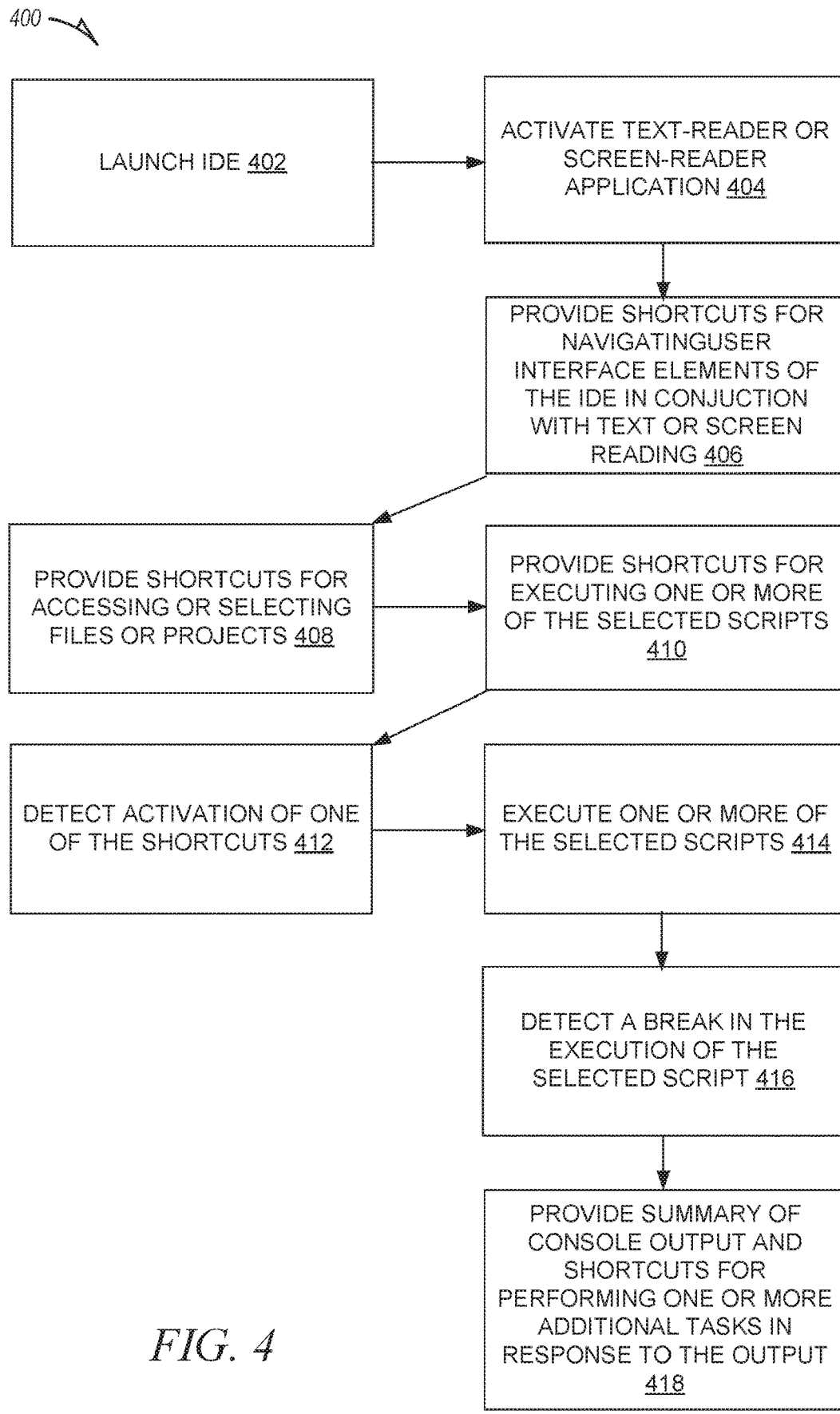
FIG. 4 is a flowchart of an example method of improving automation testing for a visually-impaired worker.

FIG. 4 is a flowchart of an example method 400 of improving automation testing for a visually-impaired worker.

At operation 402, an IDE is launched.

At operation 404, a text- or screen-reader application or tool is launched in conjunction with the IDE, screen- or text-reading application, or automated testing tool (e.g., as a plugin). In example embodiments, the screen-reading tool allows for reading through every element present on the screen, mapping each, and then using the text-to-speech converters to transform the text read from the screen and output to the users in the form of audio. For example, the screen-reading application runs on top of the IDE installed on the user's computer system and, in example embodiments, reads through every word present on the screen. In example embodiments, the screen-reader application is developed in such a way that it starts reading from pixel (0,0), (e.g., the top-left corner of the screen). The user, to continue reading, presses a single key (or a set of keys) on their keyboard, instructing an additional application (e.g., a plug-in of the screen-reader application) to control the screen-reader application in order to read through consecutive words of the screen. With the plug-in running on top of the screen-reader application, the user can access additional functionality that allows the user to perform operations more efficiently than if the user was using the screen-reader application alone. In example embodiments, this additional functionality is provided in one or more workflows (e.g., machine-learned workflows) that are associated with performing a set of automated testing functions. The additional functionality provided may depend on a particular context of the user, such as (1) an access context for finding test scripts in a directory or folder hierarchy, (2) an execution context for executing one or more selected test scripts, (3) a break context for pausing or stopping the execution of one or more test scripts, (4) a result or console processing context for appropriately processing console output corresponding to one or more test scripts (e.g., including during or after the execution of each test script), (5) a recording context for recording new test scripts, and (6) a storage context for storing or reorganizing test scripts within an underlying file or directory structure of the IDE. In example embodiments, the plug-in provides one or more supplemental user interfaces that allow the user to choose a particular context or access functionality of the IDE or automation testing tool more easily than if the user was merely using the screen-reader application alone.

At operation 406 (e.g., with the help of the additional plug-in (e.g., installed on top of the screen-reader application, which is, in turn, installed on top of the IDE)), various accessibility features are made possible for a visually-impaired user. For example, any user with access to a keyboard can go through every word written on the screen and perform actions.

Figure 5:
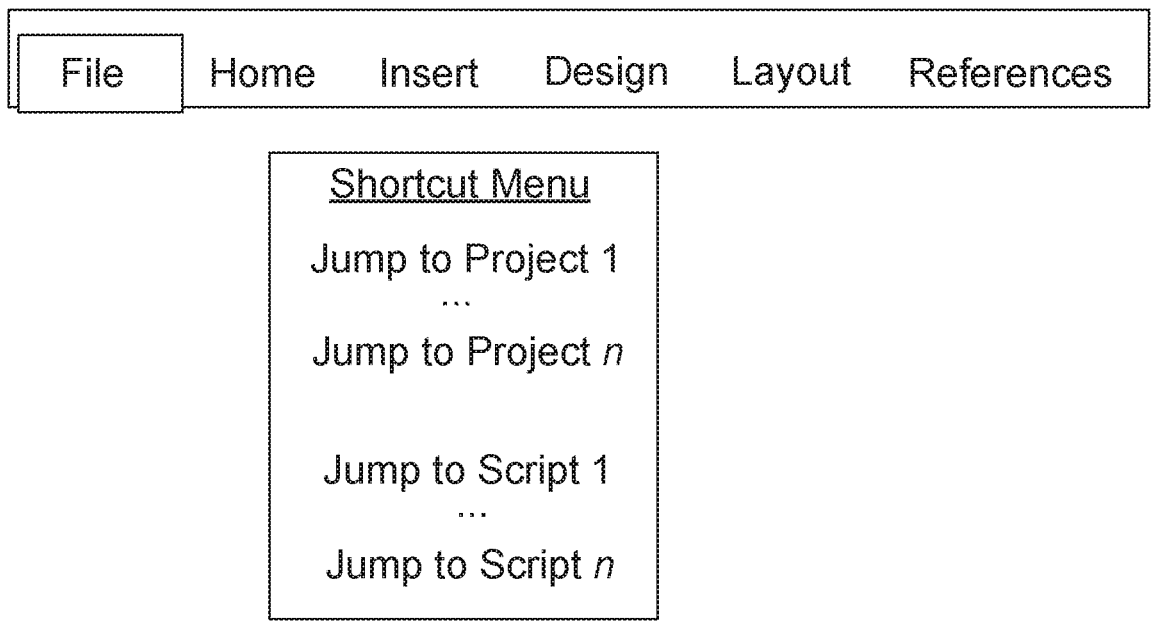
FIG. 5 is a screenshot of an example user interface associated with a plug-in for improving automated testing within an integrated development environment (IDE).

At operation 408, the screen-reader application allows for opening of and running particular test-scripts with minimal effort. For example, as depicted in FIG. 5, to access files in a file structure hierarchy of the IDE, the user may navigate to the appropriate top-level menu of the IDE (e.g., the File menu) by, for example, by clicking on the tab key (and reverse tab key) to move a selection cursor (e.g., of the screen reader application) forward (or backward) between a list of menus read by the screen-reader application, and clicking on the enter key when the selection cursor is on the desired menu.

At operation 410, the impaired user can access any project and run any test-script with just the click of a button using additional functionality provided by the plug-in. In example embodiments, when accessing the IDE in an access context, for example, the plug-in provides the user with the ability to shortcut the process of manually accessing folders (e.g., by navigating a hierarchy of menus of the IDE), instead jumping directly to folders containing scripts for a particular project or to particular scripts themselves. For example, in an access mode that serves as an access mechanism, the plug-in may provide the user with a set of project names into which the scripts have been previously grouped and/or with a set of recently accessed scripts corresponding to the set of project names. Thus, the impaired user may quickly navigate to a folder, a set of scripts, or an individual script at one or more locations in the IDE's underlying directory structure without having to manually navigate through a potentially complex directory hierarchy (e.g., from the root of the hierarchy or a root drive on a computer') via the IDE's built-in menu system. Thus, the plug-in allows the user to avoid a potentially lengthy file navigation process that may have been only weakly facilitated by the screen-reader application if it was used alone. In example embodiments, upon determining that a selection of files for execution is completed (e.g., based on a time period having expired indicating that a last selection has been made or based on an explicit indication from the user, such as a double-press of the enter key), the plug-in may automatically switch from an access mode to an execution mode without requiring further input from the user.

At operation 412, the impaired user can run test scripts with just a click of a button using additional functionality of the plug-in. In example embodiments, when accessing the IDE in an execution context, for example, the plug-in may provide the user with an option to execute one or more selected test scripts with a single press of a button (e.g., the enter key). For example, in an execution mode that serves as an execution mechanism, the plug-in may provide the user with a shortcut process that allows the user to execute the selected scripts without having to use the screen-reader application to navigate to a user interface element within the IDE for invoking the execution functionality. Thus, for example, the plug-in may allow the user to jump to the execution functionality within the IDE without having to painfully iterate through all menu choices or other intervening user interface elements that would otherwise be sequentially presented to the user if the user was using the screen-reader application alone. In example embodiments, upon determining that there are no more scripts to execute at this time (e.g., based on a time period having expired indicating that a last selection has been made or upon an explicit indication from the user, such as a double-press of the enter key), the plug-in may automatically switch from an execution mode to a break mode and/or result mode without requiring further input from the user.

At operation 414, the user can pause or stop one or more of the running scripts with just a click of a button using additional functionality of the plug-in. In example embodiments, when accessing the IDE in a break context, for example, the plug-in may provide the user with a shortcut process that allows the user to pause or stop execution of one or more scripts. In example embodiments, in a break mode that serves as a break mechanism, the plug-in may provide the user with a shortcut process to stop or pause execution of a set of scripts, including all of the scripts associated with a particular project or just an individual script. Thus, for example, the plug-in may allow the user to jump to the pausing or breaking functionality within the IDE without having to painfully iterate through all menu choices or other intervening user interface elements that would otherwise be sequentially presented to the user if the user was using the screen-reader application alone.

At operation 416, the scripts can stop their execution on one of the following three conditions:

i. The test scripts complete execution and return 'completed' output on the console of the ME.

ii. The test scripts fail at a particular instance.

iii. The user manually stops the execution of the test scripts.

In example embodiments, each of the above conditions is identified as follows. The text-reader application reads through the output of the console and sends it to the plug-in. The plug-in analyzes the output using a combination of feature extraction and natural language processing. For example, in example embodiments, the plug-in performs the following steps with respect to the output: (1) text normalization (e.g., lower casing, punctuation removal, stopwords removal, rare words removal, frequent words removal, spelling correction, tokenization, stemming lemmatization), (2) feature extraction (e.g., using matrices for number of words, number of characters, average word length, number of stopwords, number of special characters, number of numerics, number of upper-case words), (3) feature normalization, and (4) natural language processing (e.g., n-grams, word counts, term frequency matrix, inverse document frequency). Thus, for example, the plug-in may identify condition 'i,' based on a machine-learned model indicating that a feature of the output (e.g., the keyword "completed") corresponds to a successful execution of the test script. Upon detecting condition 'i', the plug-in may (e.g., using the screen-reading application) read through the output and provide the user with a choice of one or more appropriate actions to perform next. For example, the plug-in may provide the user with an option to move on to an additional set of selected scripts to be executed.

Upon detecting condition the plug-in may indicate the occurrence of an error. Additionally, the plug-in may provide the user with a choice of one or more appropriate actions to perform next. For example, the plug-in may ask the user to click the 'enter' button to go through the detailed stack-trace of the error message being returned on the console window of the IDE.

Upon detecting condition (e.g., when the user specifically presses the 'tab' or 'space' key on the keyboard to explicitly stop the execution of a specific test-script or set of test scripts), the plug-in may provide the user with one more appropriate actions to perform next, such as to select one or more different scripts to execute or to re-execute one or more of the stopped scripts. Feature extraction may help in understanding console output by picking up keywords or tags (e.g., in metadata) that are relevant to a particular break condition, such as "Error" or "Warning" keywords. Additionally, feature extraction may identify associations between colors and break conditions (e.g., red may signify an error or yellow may signify a warning). Additionally, feature extraction may identify other data that is important or relevant for identifying any error or warning condition, such as timestamps, instance numbers, code line numbers, developer-written text (e.g., "The text 'GOGGLE' is missing on home page"), and so on. The condition may then be reported to the user as a summary of key data, including the identified condition, information about the basis for the identification (e.g., a description of the features upon which the identification is based), and key data relevant for diagnosing any errors or warnings and informing the user of the next steps to be taken. Such information may include, for example, code line numbers in particular instances of code that are generating an error or warning condition, and developer-provided text corresponding to the error or warning condition, timestamps, and so on. Thus, the impaired user is provided with a summary of the console output and does not have to use the screen-reader application to read through the entirety of the console output, which may often include text that is not in a form that is easily human-readable, such as bit values, hexadecimal memory addresses, names of objects, variables, constants, or parameters, and so on.

At operation 418, the output of the console, which is captured by the text reader on the screen, is sent for further processing in the plug-in. The output is analyzed using natural language processing and basic extraction features to identify a subset of the output that is particularly relevant based on a machine-learned model. Selected portions of the subset are then sent as a further output (e.g., in the form of audio), which is duly provided for noting and recording by the user running the test-scripts. In example embodiments, for a selected next step to perform after the summary of the console output is reported to the user, the plug-in may allow the user to jump to the appropriate functionality within the IDE without having to painfully iterate through all menu choices or other intervening user interface elements that would otherwise be sequentially presented to the user if the user was using the screen-reader application alone.

The scenario proposed above is a single, extremely specific use-case for a much wider gamut of possibilities that the developers can use. With just a few simple additions, the framework can be customized to allow many more features, such as:

(a) Creation of Projects/Configurations. An organization mode and mechanism may be provided to allow the user to create folders and place files in the underlying directory structure of the IDE without having to use the screen-reader application to painfully navigate through a potentially complex directory structure. For example, the plug-in may provide one or more user interfaces for tagging files with a project name such that they are automatically grouped together under a folder corresponding to the project name. Additionally, the plug-in may provide one or more user interfaces for renaming files or folders, moving files between folders, moving folders up or down in the directory hierarchy, and so on—all with shortcut commands that do not require accessing (e.g., via the screen reader application) user interface elements from within the IDE (b) Code development and creation. A development mode and mechanism may allow the user to develop new code (e.g., via verbal commands). Such development may include recording test scripts with a single command and storing them within the directory structure of the IDE. They may also include shortcuts for editing the code, such as shortcuts for jumping to particular lines within the code, navigating to sections within the code (e.g., to particular objects, functions, constants, or parameters), and modifying the code, saving the modifications, and so on.

(c) Use of debugger. A debugger mode and mechanism may allow the user to quickly access functionality of a debugger without getting bogged down in the specifics of the user interface associated with the debugger. As with aspects of the IDE described above, various key functional elements of the debugger may be accessed via shortcuts implemented within the plug-in, allowing the user to, for example, navigate to places within the code where run-time errors or warnings are detected and receive a summary of the errors and warnings without having to be presented with an entire readout of the debugger console output.

There are many such other use cases in relation to how a framework for the visually impaired developers can be useful for a variety of other uses in the near-future in relation to development environments.

While creating a new product or an addition to an existing product, one of the major steps necessary involves understanding the problems that users are facing.

With respect to the major challenges being faced while manually testing applications using screen-reading tools such as JAWS, one major hurdle faced by the user involves dealing with graphics. In example embodiments, such images can be accessed by screen readers with the stipulation on 'alternate text' being added to the images, so that the screen readers can go through the alt-text and speak out the names of the images to the user. There are many cases, however, where alternate text isn't mentioned for a lot of graphics, which leads to slowing down the process of work for testing.

An area of improvement provided by the plug-in thus includes bettering the rich-text for the graphics and more data-oriented approach, to help the scripts running on the screen-reader engines to better grasp every aspect of the application being worked on.

Since the plug-in removes the need for going through each and every item present on the screen manually (with the help of test scripts taking care of graphics, buttons, etc.), the job of a user working on automation testing is simplified dynamically. Thus, the issue that a user with visual disability may face while handling graphics and images is reduced or erased. Automation Testing, thus, with the help of the disclosed add-on plug-ins to existing development environments, provides the user with a simpler user interface to perform their tasks. In example embodiments, the plug-in simplifies navigation within the IDE or one or more associated automated testing tools by providing supplemental user interfaces that allow the impaired user to navigate functionality of the IDE according to a machine-learned tab order and machine-learned digital landmarks. For example, a machine-learned model may be trained based on monitored behavior of impaired users while accessing the IDE to perform automated testing functions. The machine-learned model will identify a logical flow of the impaired user from each section of the user interface of the IDE to another section, refining over time a tab-through order that the user may access or engage using the plug-in. Additionally, the machine-learned model may provide a supplemental user interface for accessing digital landmarks (e.g., special labels corresponding to navigable elements of the user interface of the IDE) so that users can access the navigable elements (e.g., without having to listen to a screen-reader application read all of the text on the page). In example embodiments, the plug-in may associate one or more unique titles or headings with sections of the IDE or associated automation testing tools to ease navigation between user interface elements or sections of the user interfaces. Additionally, the plug-in may associate related content items (e.g., based on bullets, numbering, or indentation), grouping them together for purposes of providing summary data (e.g., the number of items in the list) to the user so that a user can have some context pertaining to the list without having to read through every item in the list. In example embodiments, information (e.g., metadata) pertaining to color, contrast, and size of text may be provided to the user in summary form to provide further context or used by the plug-in to determine relative importances of various textual items being presented on a user interface (which is a factor, in addition to positioning of the text from left to right and top to bottom within a section, that may be considered by the plug-in when determining an order in which the textual items are relayed to the user). In example embodiments, the plug-in may process images using metadata associated with the images, such as alt-text associated with the images, or data included in the images (e.g., colors included within the image) such that a summary, context, or meaning of the image may be conveyed to the impaired user. In example embodiments, the plug-in may control the screen reader application such that it may skip over hyperlinks, which often include long strings of letters, numbers, and symbols that are arduous to read out loud. Instead, the plug-in may provide summary information pertaining to the hyperlink, such as its associated domain or a title of a document to which the hyperlink links, to enable the impaired user to determine more efficiently whether to activate or skip over the hyperlink. In example embodiments, the plug-in may provide access to video transcripts in conjunction with any video presentation or text versions of any transmitted audio. In example embodiments, the plug-in may provide metadata pertaining to animations and options to disable such animations such that the impaired user may understand a context associated with the animation without getting distracted by it.

FIG. 5 is a screenshot of an example user interface associated with a plug-in for a screen-reading application for improving automated testing within an IDE.

In example embodiments, the IDE has a header menu with the following keywords: 'File', 'Home', 'Insert', 'Design', etc.

In example embodiments, the plug-in will help through the navigation of any IDE where the automated scripts have been coded.

In example embodiments, the screen reader starts reading with the first element, 'File'. If the user presses a particular button on the keyboard, say, tab, the plug-in causes the screen reader goes to the next element. If, however, the user presses enter, the plug-in causes the File menu of the IDE to open and the screen reader enters the contents of the File menu and reads through the sub-elements of the same. As described above, additional functionality is provided by the plug-in. For example, the plug-in may provide the user with the ability to shortcut the process of manually accessing folders, allowing the user to jump directly to folders containing scripts for a particular project or to particular scripts themselves without having to navigate through a potentially complex hierarchy of folders using the screen-reader application in conjunction with the native user interface of the IDE. For example, the user may be provided by the plug-in with a supplemental user interface that includes a shortcut menu having a set of project names into which test scripts have been previously grouped and/or having a set of recently accessed scripts that have been previously associated with a set of projects. Thus, the impaired user may quickly jump to a folder, a set of scripts, or an individual script that is stored at one or more locations in the IDE's underlying directory structure without having to manually navigate through a potentially complex directory hierarchy (e.g., from a root folder) via the IDE's built-in menu system.

The shortcut menu may be presented in place of or in addition to the navigation (e.g., File) menu that is included natively in the user interface for the IDE. The menu options may be customizable by the user (e.g., the user may specify the menu choices during creation or accessing of folders or files by requesting access to an additional user interface provided by the plug-in). As described above, the plug-in may operate in different modes depending on the context of the impaired user. Thus, for example, when the user is determined to be in a file selection or access context, an access mechanism of the plug-in may provide access to the supplemental user interface to simplify the process of accessing or selecting projects and files included in the underlying hierarchy of the IDE.

Additionally, as described above, the plug-in may automatically change modes according to the context. Thus, for example, after selecting scripts or projects, the plug-in may determine or anticipate (e.g., based on a machine-learned model) that the user's context will next switch to an execution context in which the user will choose to execute one or more of the selected scripts or projects. Accordingly, the plug-in may switch to an execution mode, providing one or more additional supplemental user interfaces designed to simplify the process of executing the one or more selected scripts or projects, as described above. Similarly, the plug-in may identify or anticipate each subsequent context of the user, such as a break context, a debug context, or a result context, automatically switching to a corresponding mode and providing the appropriate supplemental user interfaces to simplify access of various functions of the IDE for the impaired user, as described above.

Additionally, the plug-in may provide the user with the ability to override the automatically-selected mode with an explicit specification of a desired mode or context. Any overriding by the user of an automatically selected mode, as well as other monitoring of the user's behavior, may be incorporated into a machine-learned model for adapting the plug-in to accommodate use patterns specific to the user or to a plurality of users of the plug-in. Initially, the patterns of the impaired user may be drawn from workflows of non-impaired users and adjusted accordingly for impaired users over time as training data about impaired users is gathered and integrated into the plug-in.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In example embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in Which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114) and via one or more appropriate interfaces (e.g., APIs).

Example embodiments may be implemented in digital electronic circuitry, or in computer hardware, firmware, or software, or in combinations of them. Example embodiments may be implemented using a computer program product (e.g., a computer program tangibly embodied in an information carrier, in a machine-readable medium for execution by, or to control the operation of, data processing apparatus, such as a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Figure 6:
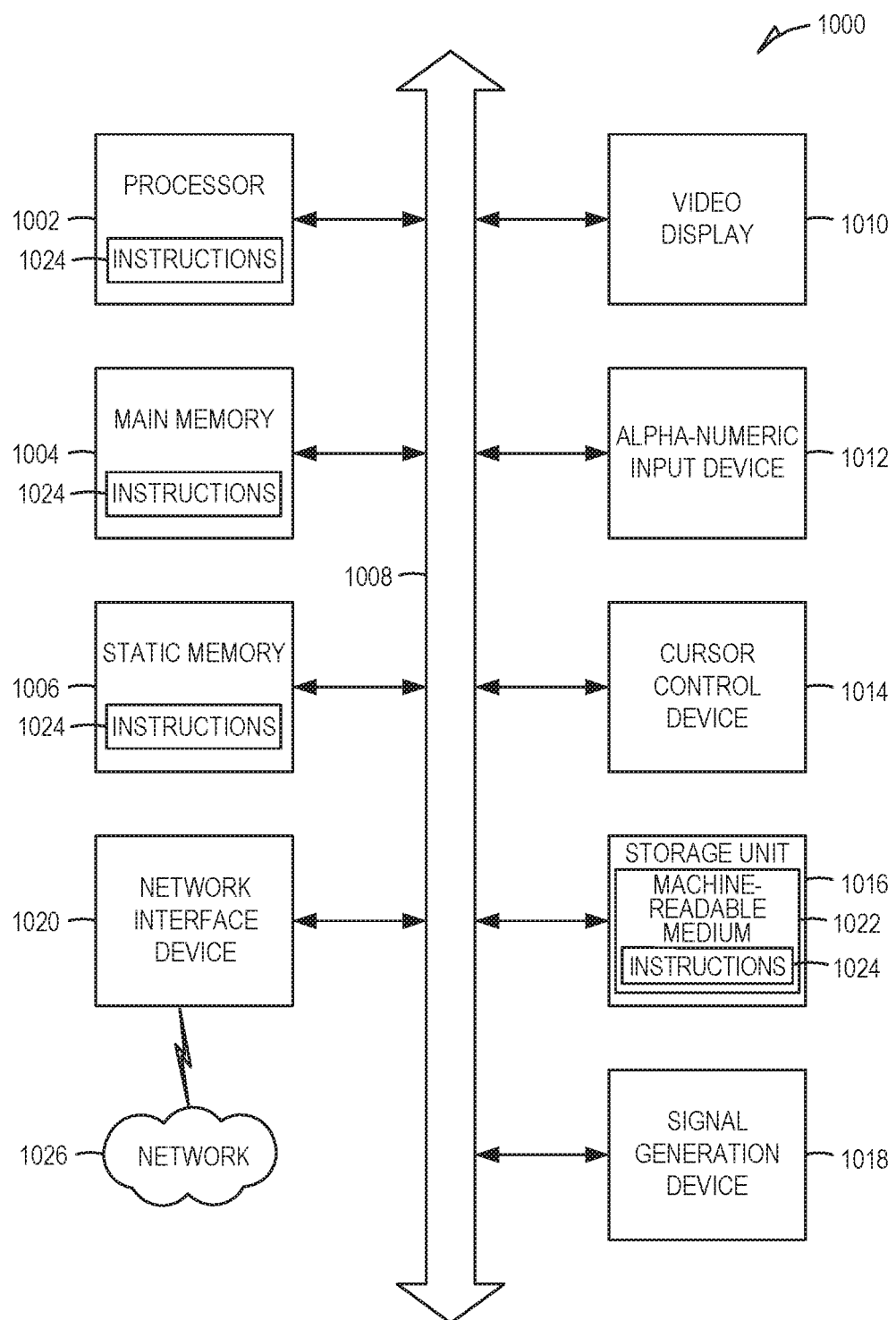
FIG. 6 is a block diagram of a machine in the example form of a computer system within which instructions for causing the machine to perform any one or more of the operations or methodologies discussed herein may be executed.

FIG. 6 is a block diagram of machine in the example form of a computer system 1000 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a mobile phone (e.g., an iPhone or a mobile phone executing an Android operating system), a web appliance, a network router, a network switch or a network bridge, or any machine capable of executing instructions (sequential or otherwise) that specify actions to be taken by that machine. Further, while only a single machine is illustrated, the term 'machine' shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a storage unit 1016 (e.g., a disk drive unit), a signal generation device 1018 (e.g., a speaker), and a network interface device 1020.

The storage unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding, or carrying data structures utilized by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices, e.g., Erasable Programmable Read-Only Memory (EPROM). Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Furthermore, the machine-readable medium 1022 is non-transitory in that it does not embody a propagating signal. However, labeling the tangible machine-readable medium 1022 as "non-transitory" should not be construed to mean that the medium is incapable of movement the medium 1022 should be considered as being transportable from one physical location to another. Additionally, since the machine-readable medium 1022 is tangible, the medium 1022 may be considered to be a machine-readable device.

The instructions 1024 may further be transmitted or received over a communications network 1026 using a transmission medium. The instructions 1024 may be transmitted using the network interface device 1020 and any one of a number of well-known transfer protocols (e.g., hypertext transfer protocol (HTTP)). Examples of communication networks include LANs, WANs, the Internet, mobile telephone networks, plain old telephone service (POTS) networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1026 may be one of the networks 114.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of example embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of example embodiments. Combinations of the above embodiments, and other embodiments not specifically described herein, will be apparent to those of skill in the art upon reviewing the above description.

What is claimed is:

1. A system comprising:
   one or more processors;
   one or more memories; and
   a plug-in for a screen reader application incorporated into the one or more memories, the plug-in configured to cause the one or more processors to perform operations for simplifying automated testing within an integrated development environment (IDE) for a user having a visual impairment, the operations comprising:
   providing an access mechanism to the user for selecting automated testing scripts from within the IDE by responding to audio communications describing one or more access commands;
   providing an execution mechanism to the user for executing one or more of the selected automated testing scripts;
   providing a result mechanism to the user, the result mechanism including a summary of a result of the executing of the one or more selected testing scripts, the summary based on an analysis of console output of the IDE, the analysis including performing feature extraction, the performing of the feature extraction including identifying a keyword or a color of text included in the output that corresponds to a warning or an error condition, and performing natural language processing on the console output to generate a natural language description of the result, the generating of the natural language description including presenting the identification of the warning or the error condition and the basis for the identification, the generating of the natural language description further including omitting one or more of bit values, hexadecimal memory addresses, names of objects, variables, constants, parameters included in the output, wherein the keyword is a machine-learned feature that is learned based on monitored behavior of a plurality of users accessing the IDE to perform the automated testing; and
   providing an action mechanism to perform an additional action, the additional action selected based on a type of the result.

2. The system of claim 1, wherein the providing of the access mechanism includes communicating an identifier of a command for navigating in a directory structure containing the automated testing scripts and responding to an input associated with activating the command.

3. The system of claim 1, wherein the providing of the execution mechanism includes responding to an input associated with one or more of starting, pausing, or stopping the executing of the one or more selected scripts.

4. The system of claim 1, wherein the summary includes an identification of an error message generated during the executing of the one or more selected scripts and keywords within the error message that summarize the error message.

5. The system of claim 4, wherein the natural language description does not include information pertaining to punctuation elements included within the error message.

6. The system of claim 1, further comprising, based on the type of the result being an error, determining that the additional action is to enter a debug mode.

7. The method of claim 1, wherein the color is a machine-learned feature.

8. The method of claim 1, wherein selected portions of the subset are sent as further output.

9. The method of claim 8, wherein the further output is in audio form.

10. A method comprising:
    simplifying, using one or more computer processors of a plug-in for a screen reader application, automated testing within an integrated development environment (IDE) for a user having a visual impairment, the simplifying comprising:
    providing, using the one or more computer processors, an access mechanism to the user for selecting automated testing scripts from within the IDE by responding to audio communications describing one or more access commands;
    providing, using the one or more computer processors, an execution mechanism to the user for executing one or more of the selected automated testing scripts;
    providing a result mechanism to the user, the result mechanism including a summary of a result of the executing of the one or more selected testing scripts, the summary based on an analysis of console output of the IDE, the analysis including performing feature extraction, the performing of the feature extraction including identifying a keyword or a color of text included in the output that corresponds to a warning or an error condition, and performing natural language processing on the console output to generate a natural language description of the result, the generating of the natural language description including presenting the identification of the warning of or the error condition and the basis for the identification, the generating of the natural language description further including omitting one or more of bit values, hexadecimal memory addresses, names of objects, variables, constants, parameters included in the output wherein the keyword is a machine-learned feature that is learned based on monitored behavior of a plurality of users accessing the IDE to perform the automated testing; and providing an action mechanism to perform an additional action, the additional action selected based on a type of the result.

11. The method of claim 10, wherein the providing of the access mechanism includes communicating an identifier of a command for navigating in a directory structure containing the automated testing scripts and responding to an input associated with activating the command.

12. The method of claim 10, wherein the providing of the execution mechanism includes responding to an input associated with one or more of starting, pausing, or stopping the executing of the one or more selected scripts.

13. The method of claim 10, wherein the summary includes an identification of an error message generated during the executing of the one or more selected scripts and keywords within the error message that summarize the error message.

14. The method of claim 13, wherein the natural language description does not include information pertaining to punctuation elements included within the error message.

15. The method of claim 10, further comprising, based on the type of the result being an error, determining that the additional action is to enter a debug mode.

16. A non-transitory machine-readable medium storing instructions that, when executed by one or more computer processors a plug-in for a screen reader application, cause the one or more computer processors to perform operations for simplifying automated testing within an integrated development environment (IDE) for a user having a visual impairment, the operations comprising:

providing an access mechanism to the user for selecting automated testing scripts from within the IDE by responding to audio communications describing one or more access commands;

providing an execution mechanism to the user for executing one or more of the selected automated testing scripts;

providing a result mechanism to the user, the result mechanism including a summary of a result of the executing of the one or more selected testing scripts, the summary based on an analysis of console output of the IDE, the analysis including performing feature extraction, the performing of the feature extraction including identifying a keyword or a color of text included in the output that corresponds to a warning or an error condition, and performing natural language processing on the console output to generate a natural language description of the result, the generating of the natural language description including presenting the identification of the warning of or the error condition and the basis for the identification, the generating of the natural language description further including omitting one or more of bit values, hexadecimal memory addresses, names of objects, variables, constants, parameters included in the output, wherein the keyword is a machine-learned feature that is learned based on monitored behavior of a plurality of users accessing the IDE to perform the automated testing; and providing an action mechanism to perform an additional action, the additional action selected based on a type of the result.

17. The non-transitory machine-readable medium of claim 16, wherein the providing of the access mechanism includes communicating an identifier of a command for navigating in a directory structure containing the automated testing scripts and responding to an input associated with activating the command.

18. The non-transitory machine-readable medium of claim 16, wherein the providing of the execution mechanism includes responding to an input associated with one or more of starting, pausing, or stopping the executing of the one or more selected scripts.

19. The non-transitory machine-readable medium of claim 16, wherein the summary includes an identification of an error message generated during the executing of the one or more selected scripts and keywords within the error message that summarize the error message.

20. The non-transitory machine-readable medium of claim 19, wherein the natural language description does not include information pertaining to punctuation elements included within the error message.

* * * * *